(12) United States Patent
Brosius

(10) Patent No.: US 8,242,904 B2
(45) Date of Patent: *Aug. 14, 2012

(54) SYSTEM AND METHOD FOR ASSET TRACKING AND MONITORING

(75) Inventor: Jay Brosius, Frederick, MD (US)

(73) Assignee: SkyBitz, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,497

(22) Filed: Feb. 21, 2011

(65) Prior Publication Data

US 2011/0279264 A1 Nov. 17, 2011

Related U.S. Application Data

(63) Continuation of application No. 12/465,892, filed on May 14, 2009, now Pat. No. 7,898,411, which is a continuation of application No. 11/834,052, filed on Aug. 6, 2007, now Pat. No. 7,545,266, which is a continuation of application No. 11/005,307, filed on Dec. 7, 2004, now Pat. No. 7,265,668.

(60) Provisional application No. 60/528,780, filed on Dec. 12, 2003.

(51) Int. Cl.
*G08B 1/08* (2006.01)
(52) U.S. Cl. .................................. 340/539.22
(58) Field of Classification Search .............. 340/539.22, 340/10.1, 572.1–572.9, 825.49, 568.1, 539.13
See application file for complete search history.

(56) References Cited

U.S. PATENT DOCUMENTS

| 5,565,858 | A | * | 10/1996 | Guthrie ...................... 340/10.33 |
| 5,691,980 | A | | 11/1997 | Welles, II et al. |
| 5,955,986 | A | | 9/1999 | Sullivan |
| 6,094,162 | A | | 7/2000 | Sullivan |
| 6,154,171 | A | | 11/2000 | Sullivan |
| 6,169,514 | B1 | | 1/2001 | Sullivan |
| 6,243,648 | B1 | | 6/2001 | Kilfeather et al. |
| 6,408,178 | B1 | | 6/2002 | Wickstrom et al. |
| 6,480,788 | B2 | | 11/2002 | Kilfeather et al. |
| 6,560,536 | B1 | | 5/2003 | Sullivan et al. |
| 6,725,158 | B1 | | 4/2004 | Kilfeather et al. |
| 6,753,775 | B2 | * | 6/2004 | Auerbach et al. ........ 340/539.22 |
| 6,972,682 | B2 | * | 12/2005 | Lareau et al. .............. 340/568.1 |

(Continued)

FOREIGN PATENT DOCUMENTS

WO WO 01/67127 A2 9/2001
WO WO 03/088508 A2 10/2003

*Primary Examiner* — Phung Nguyen
(74) *Attorney, Agent, or Firm* — Duane S. Kobayashi

(57) ABSTRACT

A multi-mode asset tracking and monitoring system and method is provided that enables comprehensive reporting of asset position, status, and alerts. In one embodiment, the multi-mode system and method is based on the addition of a local network monitoring system to a wide area satellite network monitoring system. In this example, the local network monitoring system would add container presence and status monitoring in crowded environments (e.g., within a port facility, on-board a ship, etc.), while the wide area satellite network monitoring system would provide tracking and monitoring coverage when the container is in dispersed environments. Both the local and wide area monitoring systems work together to provide end-to-end container tracking and monitoring to thereby ensure continuous container tracking and monitoring from container loading to container unloading.

18 Claims, 3 Drawing Sheets

U.S. PATENT DOCUMENTS

| | | |
|---|---|---|
| 7,265,668 B1 | 9/2007 | Brosius |
| 7,273,172 B2 * | 9/2007 | Olsen et al. .................. 235/385 |
| 7,319,414 B2 | 1/2008 | Horstmeyer |
| 7,545,266 B2 | 6/2009 | Brosius |
| 7,898,411 B2 | 3/2011 | Brosius |
| 2003/0204407 A1 * | 10/2003 | Nabors et al. .................... 705/1 |
| 2004/0041706 A1 * | 3/2004 | Stratmoen et al. ....... 340/539.26 |
| 2006/0164239 A1 * | 7/2006 | Loda ....................... 340/539.22 |

* cited by examiner

SYSTEM AND METHOD FOR ASSET TRACKING AND MONITORING

This application is a continuation of 12/465,892, filed May 14, 2009, Now U.S. Pat. No. 7,898,411, issued Mar. 1, 2011, which is a continuation of 11/834,052, filed Aug. 6, 2007, Now U.S. Pat. No. 7,545,266, issued Jun. 9, 2009, which is a continuation of 11/005,307, filed Dec. 7, 2004, now U.S. Pat. No. 7,265,668, issued Sep. 4, 2007, which claims priority to provisional application No. 60/528,780, filed Dec. 12, 2003. The above-identified applications and patents are each incorporated herein by reference in its entirety.

This invention was made with Government support under contract DTMA1G02001 awarded by the United States Maritime Administration. The Government has certain rights in the invention.

BACKGROUND

1. Field of the Invention

The present invention relates generally to monitoring and tracking and, more particularly, to a system and method for asset tracking and monitoring.

2. Introduction

Security from terrorist actions has taken on an increased level of prominence in the United States. These terrorist threats can arise from internal sources or from external sources. With regard to external borne threats, one concern is the tracking and monitoring of semi-trailers, rail cars, and related shipping industry assets in the container arena as they cross into United States territory. Unless these assets can be secured and tracked prior to and subsequent to entry into the United States, the risk of terrorist activities will be significant. What is needed therefore is a system and method for global container tracking.

SUMMARY

A system and/or method for asset tracking and monitoring, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
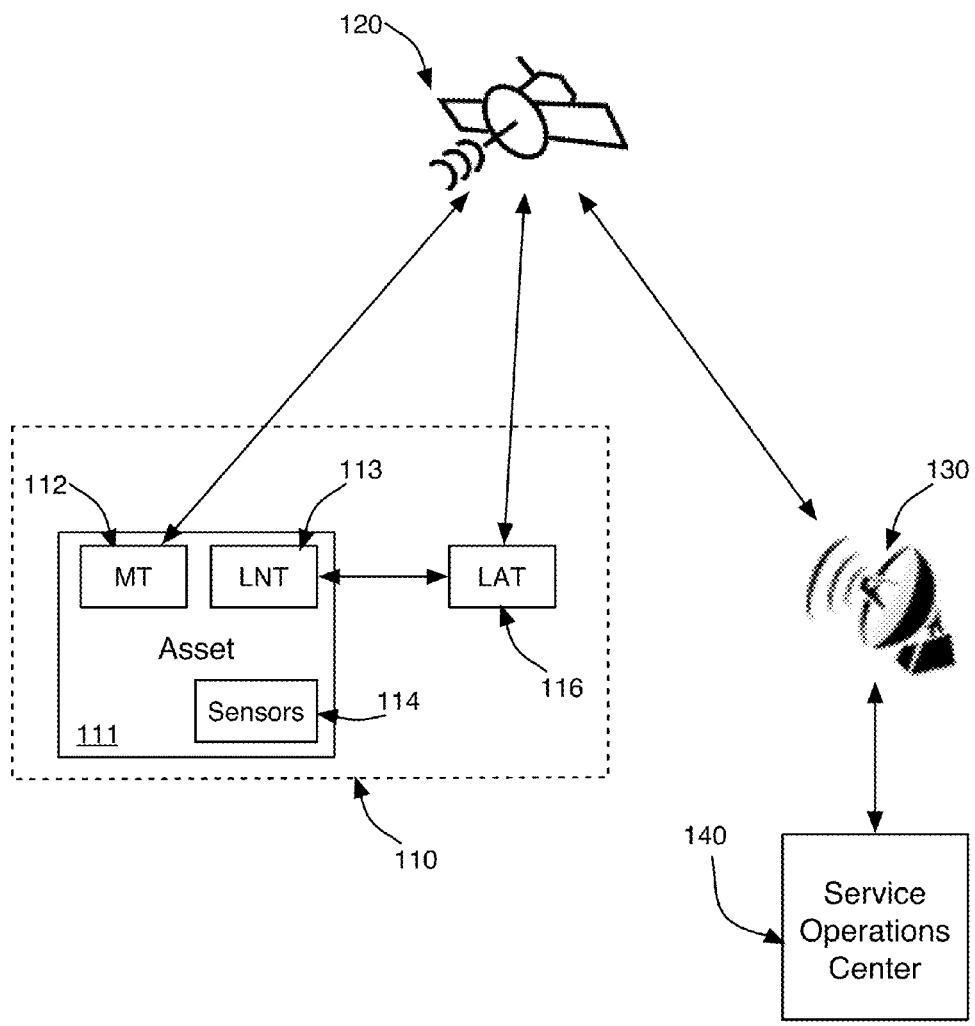
FIG. 1 illustrates an embodiment of a system of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, one of the security issues that has faced increased scrutiny is the risks associated with assets (e.g., containers, deployments, shipments, trailers, heavy equipment, vehicles, and other mobile assets) that cross U.S. borders. Security for these assets is a natural hazard due to the inherent inability to control access to these assets along their entire journey into and through a U.S. port. Typically, these assets are brought to a foreign port, loaded onto a ship, transported to a U.S. port, and loaded onto rail or semi-trailer transport to a domestic destination. Throughout this journey, the asset is susceptible to potential terrorist elements that seek to subvert the asset shipment to their own purposes. Securing and tracking these assets throughout their journey into the U.S. is therefore a necessary task in reducing the likelihood of asset-borne security threats.

In this environment, maintaining continuous tracking and monitoring visibility of an asset is of paramount importance. A loss of visibility provides terrorist elements with an unchecked opportunity to access and subvert an asset. Thus, one of the objectives of the present invention is to provide a framework that enables an asset to be tracked and monitored whether or not the asset is sitting in a rail or ship yard, or sitting on a train or ship during transport. As would be appreciated, each of these environments can present their own challenges in providing proper communication facilities that enable real-time or near real-time reporting of position, status, and alert information from the asset.

In designing a proper security framework where it is possible to maintain contact with an asset during all phases of shipment from origin to destination, it has become apparent that a single monitoring mechanism may not be sufficient to satisfy the security objectives. In accordance with the present invention, a multi-mode asset monitoring capability is envisioned to provide high-availability coverage over a range of transport phases.

For example, satellite-based communications and positioning means operate with relatively small link margins and can therefore require relatively unimpaired paths from the terminal to the satellite. Such paths, however, may not be available within container yards, where assets are often stacked. This problem can also exist in those asset environments where assets are stored within the bowels of a ship.

Terrestrial mode communications also have their limitations. For example, cellular systems offer much better link margins than satellite communications means except in fringe and shadowed areas. However, once out of cellular coverage terrestrial mode communications does not work. The unfortunate consequence is that terrestrial mode communications would not supply coverage over many rail routes, and certainly not on offshore shipping routes.

Notwithstanding the limitations of satellite and terrestrial communication systems, it is recognized that local monitoring networks seem to offer strengths precisely where satellite networks fall short (i.e., in relatively confined yard and shipboard environments). Here, local monitoring networks can represent those networks that are largely directed to the operating area of the supported operation, such as in a marine terminal, a truck terminal, aboard a ship, on a train, in a rail yard, in a shipping depot, in a tunnel, etc. In one embodiment, the local network collects information from terminals scattered within the local area, processes and screens the data, and presents it to a communications node within the local area for routing to a remote central data collection facility. In this manner, a local wireless network simplifies the communications problem at the operating site (i.e., yard or ship) by enabling a single, central communications means from the site to the central facility. In various embodiments, this could be done by Internet, leased line, wireless telephone or data services (e.g., PCS), another satellite network, or a combination of the above.

It is a feature of the present invention that a local monitoring network can be used in combination with a wide area monitoring network (e.g., satellite) to produce a multi-mode solution. This multi-mode solution would facilitate complete coverage across an asset's international route. In this framework, the local monitoring network can be used to report tracking and monitoring information to a central facility when out of contact with a satellite network, while the wide area satellite network can be used to report tracking and monitoring information to a central facility when out of contact with a local monitoring network. Here, each mode would use a different communications network to report asset position, status, and alert information. As would be appreciated, the various communications networks would have different performance characteristics, to thereby complement each other for a particular monitoring application.

Thus, in accordance with the present invention, distinct modes of network communications can be used to monitor assets. In one embodiment, complementary modes of communication can also be used simultaneously or in sequence when multiple modes are available. Further, in one embodiment, one network's availability can preempt report via another network, thereby increasing efficiency in communications network use. In another embodiment, each network could be used to provide reports whenever available regardless of the status of another network, thereby providing improved reliability through redundancy. In general, any one network could facilitate control operations in another network, or for configuration of devices in another network.

Information from the various monitoring networks can then be combined or otherwise integrated at a remote central information processing and delivery facility to produce a continuous tracking and monitoring log during the asset's entire international journey.

To illustrate the features of the security framework of the present invention, reference is now made to the system diagram of FIG. 1. As illustrated, the security framework includes asset 111 that is contained within a local area 110 (e.g., ship, ship yard, rail yard, or the like). Position, status, and alert information can be communicated to service operations center (SOC) 140 via satellite 120 and antenna 130.

In one embodiment, SOC 140 is built around a relational data base managing all relevant system, user, terminal, and transaction data. Several back end servers manage internal system functions, such as terminal and protocol management and position solving, while front-end servers manage applications and web delivery. SOC 140 can deliver information to customers in a number of ways, including by web account, URL query, XML data delivery (including the XML trailer tracking standard), email, and file transfer protocol (FTP).

As further illustrated in FIG. 1, asset 111 can include sensors 114 that are used to detect various conditions at asset 111. In various examples, sensors 114 can be used to detect intrusion, light, movement, heat, radiation, or any other characteristic that would bear on the container's security. Events detected by sensors 114 are communicated to service operations center 140 using mobile terminal (MT) 112 and/or local network terminal (LNT) 113. It should be noted that while MT 112 and LNT 113 are illustrated as separate devices, they can be combined into a single multi-mode device. More generally, the multi-mode device can be designed to communicate in any number of modes dictated by a particular implementation.

In general, MT 112 can be used to communicate tracking and monitoring information to SOC 140 directly via satellite 120. LNT 113, on the other hand, can be used to communicate tracking and monitoring information to SOC 140 through local area terminal (LAT) 116. In the embodiment illustrated in FIG. 1, LAT 116 would forward information communicated by LNT 113 to SOC 140 through satellite 120. In an alternative embodiment, LAT 116 can communicate information to SOC 140 using a leased line, Internet or other land-based connection scheme. The operation of the alternative communication paths reflected by MT 112 and LNT 113 will now be described in greater detail with reference to the flowchart of FIG. 2.

Figure 2:
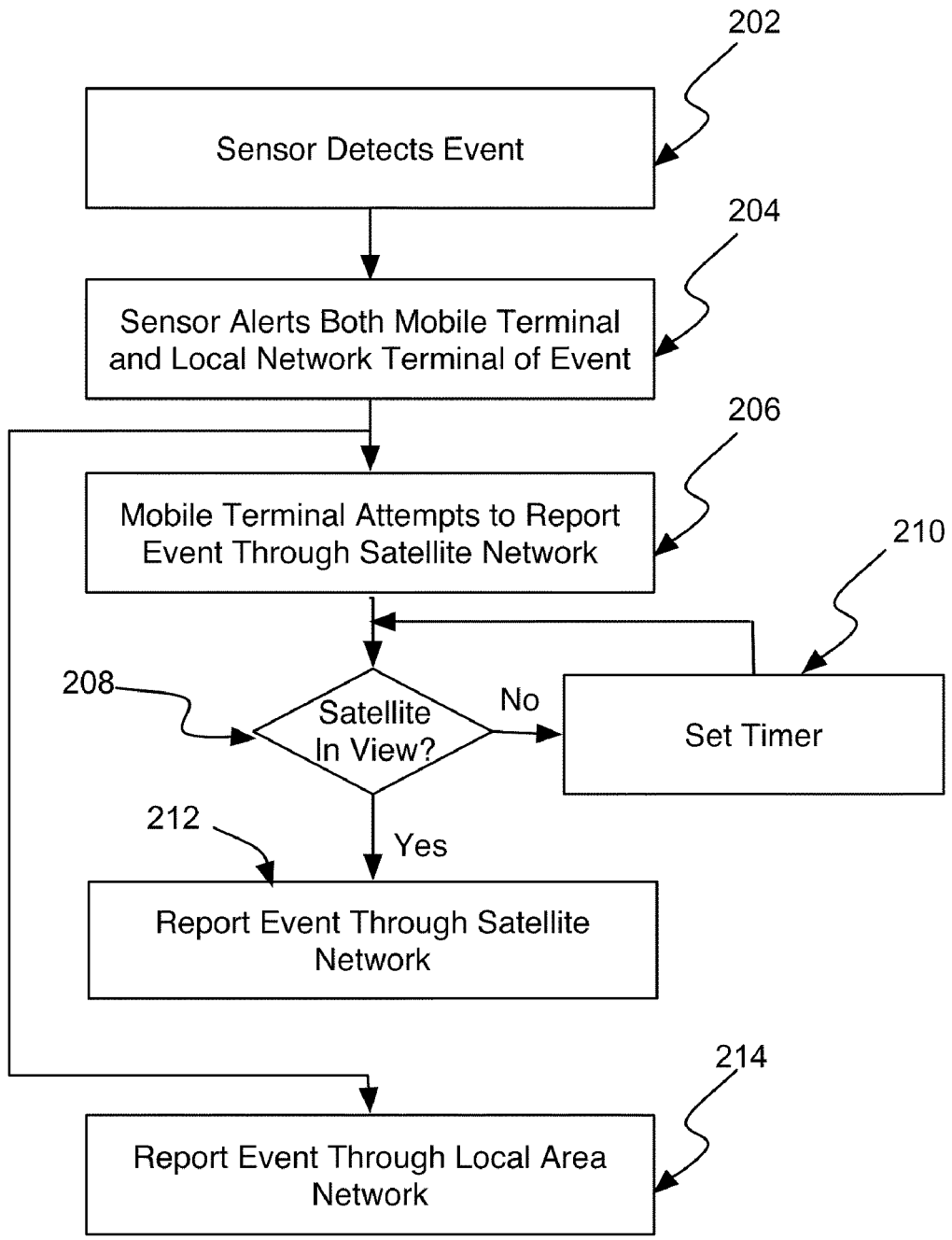
FIG. 2 illustrates a flowchart of a process of the present invention.

As illustrated, the flowchart of FIG. 2 begins with the detection by sensor 114 of an event. As noted, sensor 114 can be designed to detect various conditions such as intrusion (e.g., door sensor), light, heat, motion, radiation, or the like. As would be appreciated, asset 111 can be configured to include any number or combination of sensors depending on the particular application and level of security desired. Once sensor 114 detects an event, it would then alert at least one of MT 112 and LNT 113 at step 204.

In various embodiments, sensors 114 can be coupled directly to MT 112 and/or LNT 113. For example, if sensors 114 are coupled directly only to MT 112, then a connection may also be established between MT 112 and LNT 113, to thereby facilitate an effective connection between LNT 113 and sensors 114.

After MT 112 and/or LNT 113 has been alerted to the detected event, MT 112 and/or LNT 113 would then proceed to communicate the detected event information to SOC 140. Considering first MT 112, when any of sensors 114 activates, sensor 114 awakens MT 112 and causes it to enter a mode to report immediately on sensor status and activation. This process is represented by step 206 where MT 112 would attempt to report the event to SOC 140 through a direct connection to satellite 120.

In one embodiment, MT 112 is represented by the MT developed by SkyBitz, Inc. for use in their Global Locating System (GLS). The SkyBitz MT is built to Mil-Std 810F and SAE-J1077 environmental specifications, and is built as a software-configurable radio. Eight AA lithium batteries give it a battery lifetime of 4500 position reports combined with a shelf-life of over 10 years.

The combination of the protocol and mobile terminal design enables the mobile terminal to support position reports, MT paging (unscheduled requests for information from the MT), event reports (unscheduled, real time reporting of events detected by the MT), and low bandwidth data traffic. The MT can accommodate multiple simultaneous assignments, and can be configured remotely over the air. It also automatically adapts to changes in the network, and roams automatically among beams within a satellite footprint and among satellites. The GLS system is configured to use transponding satellites using the international geostationary L-band mobile satellite allocation.

The MT supports a number of local interfaces through a single weather-tight, triply-sealed connector. Through this connector the MT can monitor two simple contact closure sensors and operates two internal switches to control local external devices. It accepts external power and uses it when present in preference to internal batteries. And it controls an RS-485 data bus, enabling communications with up to six simultaneously connected intelligent devices.

Referring back to FIG. 2, if MT 112 determines that satellite 120 is not in view, it would then set a timer at step 210 for a short delay (e.g., seconds to minutes), go back to sleep, and reawaken when the timer expires to try again. When the timer has expired, the process would continue back to step 208, where MT 112 would again determine if satellite 120 is in view. This process will repeat until it is successful. In one embodiment, timer intervals will increase with successive failures to receive the satellite signal in order to conserve battery when blocked from satellite 120 for an extended period.

If MT 112 determines at step 208 that the satellite is in view, then MT 112 would then proceed to report the event to SOC 140 through satellite 120. In one embodiment, MT 112 reports the event by seeking an event timeslot or otherwise unoccupied timeslot (as evidenced by the forward link on that timeslot), and transmits a position and sensor status report over the corresponding return timeslot. It then proceeds to a slightly later timeslot to receive an acknowledgement. MT 112 will retry if it receives no acknowledgement.

As FIG. 2 further illustrates, a sensor alert provided to LNT 113 will also cause LNT 113 to report the event to SOC 140. This process is represented by step 214 where LNT 113 reports the event using a local area network. In one embodiment, LNT 113 receives the alert by sensor 114 directly. In another embodiment, LNT 113 is awakened by MT 112. Here, when MT 112 initially awakens due to a sensor alert, it can be designed to also close an appropriate contact controlling LNT 113 to alert LNT 113 as well of the event. In one embodiment, LNT 113 can then send "blinks", or brief emissions, on an ongoing basis at regular settable intervals (e.g., up to four minutes) between blinks. If a sensor contact is closed, LNT 113 can immediately send a set of blinks with the change in status.

As illustrated in FIG. 1, LNT 113 can be generally designed to communicate with LAT 116 via a local network connection. LAT 116 can then proceed to communicate information generated by LNT 113 to SOC 140 via satellite 120. In one embodiment, LAT 116 is embodied as a similar unit to MT 112. In this embodiment, the primary difference between LAT 116 and MT 112 would be the item to which the units are fixed. MT 112 would be fixed to an asset being tracked and monitored, while LAT 116 would be fixed to an element within local area 110.

Figure 3:
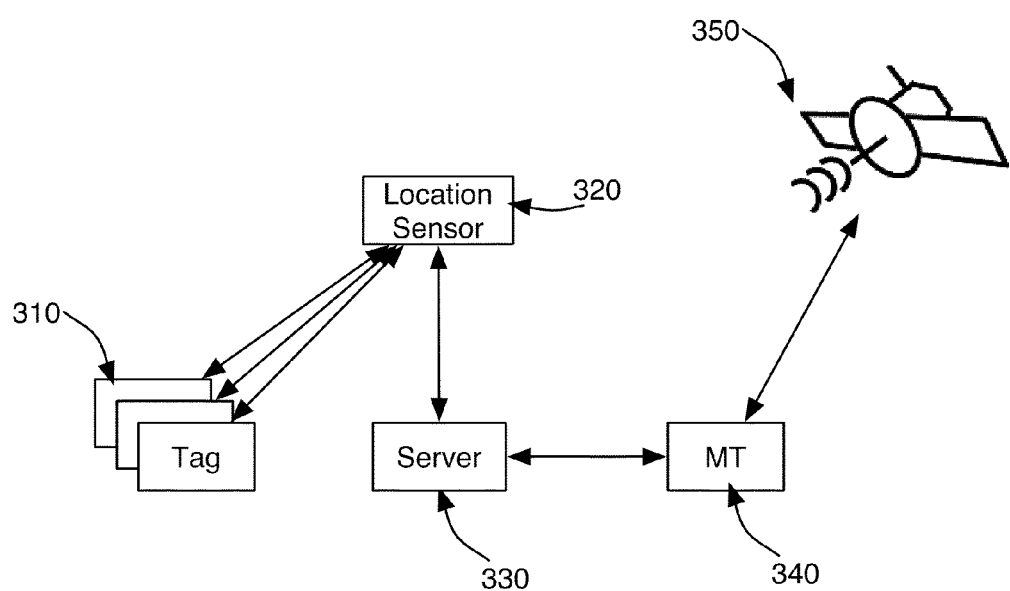
FIG. 3 illustrates an embodiment of a local network portion of the present invention.

As would be appreciated, the specific method by which LNT 113 would communicate with LAT 116 would be implementation dependent. One embodiment of a communication mechanism between LNT 113 and LAT 116 is illustrated in FIG. 3. In this embodiment, location sensor 320 is operative to listen to emissions by tags 310, which are individually fixed to the plurality of container assets that are distributed in a local area 110. Location sensor 320 would then report inform server 330 of the presence and status of tags 310 in local area 110. Any location sensor 320 able to hear tag 310 in turn reports the change in tag status to server 330. In one embodiment, several sensors 320 can be arranged around a local area 110 (e.g., ship yard, rail yard, ship, or the like) to locate each tag 310 using time difference of arrival techniques.

One example of tags 310 and location sensor 320 are the tags and location sensors manufactured by WhereNet, Inc. In general, WhereNet's local wireless locating and monitoring system has been used for locating and monitoring tags within a yard, depot, or plant environment. WhereNet's WhereTags operate in the 2.4 Ghz Industrial, Scientific, and Medical band, and can be set up to emit periodically from every few seconds to every few minutes. Tag emissions are spread spectrum, spread across 30 megahertz, and operate either at 2.5 milliwatts or 50 milliwatts, depending on the model. Each emission contains data on tag identity, tag state, the state of various sensor inputs, and other information. Emissions last only several milliseconds each, permitting very long battery life, up to seven years depending on type and report rate.

After server 330 collects reported information from tags 310, server 330 would then proceed to report this information back to SOC 140. In the illustrated embodiment, server 330 communicates with MT 340, which is operative to transmit information to the SOC via satellite 350.

In one embodiment, communication between server 330 and MT 340 is enabled using the local RS-485 data bus of MT 340. In general, the RS-485 data bus supports among other things an RS-485 interface to local digital devices. In this embodiment, the RS-485 interface is used to transport packets from server 330 to the SOC using satellite 350. Here, a software application hosted on server 330 extracts data from the database on server 330, formats it, adds the necessary RS-485 communications protocol layers, and deliver it to MT 340. At the SOC, application software would then extract the data from the incoming packets.

It will be appreciated by those skilled in the art that the system and method of the present invention can be used in environments other than those disclosed herein. It will thus be appreciated by those skilled in the art that other variations of the present invention will be possible without departing from the scope of the invention as disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An asset monitoring method in an asset monitoring system fixed to an asset, comprising:
   transmitting first monitoring information to a service center using a first monitoring system portion of said asset monitoring system, said first monitoring system portion transmitting said first monitoring information to said service center using a first communication network; and
   transmitting second monitoring information to said service center using a second monitoring system portion of said asset monitoring system, said second monitoring system portion transmitting said second monitoring information to said service center using a second communication network different from said first communication network, wherein at least a part of said transmitting second monitoring information is during a time when said first monitoring system portion is unable to access said first communication network.

2. The method of claim 1, wherein said first communication network is a satellite communication network and said second communication network is a non-satellite communication network.

3. The method of claim 1, wherein said first monitoring system portion and said second monitoring system portion are separate physical units fixed to said asset.

4. The method of claim 1, wherein said first monitoring system portion and said second monitoring system portion are parts of an integrated physical unit fixed to said asset.

5. The method of claim 1, wherein at least a part of said transmitting by said first monitoring system portion is during a time when said second monitoring system portion is unable to access said second communication network.

6. The method of claim 1, wherein said second communication network covers an area that facilitates a collection of multiple assets.

7. An asset monitoring system fixed to an asset, said asset traversing a route from a first location to a second location, comprising:
   a first monitoring system portion that is designed to transmit monitoring information to a service center using a first communication network, wherein said first monitoring system portion does not have access to said first communication network during at least part of said route; and
   a second monitoring system portion that is designed to transmit monitoring information to said service center using a second communication network different from said first communication network, wherein at least part of said transmission by said second monitoring system portion occurs during said at least part of said route.

8. The system of claim 7, wherein said monitoring information includes sensor information.

9. The system of claim 7, wherein said first monitoring system portion and said second monitoring system portion are separate physical units fixed to said asset.

10. The system of claim 7, wherein said first monitoring system portion and said second monitoring system portion are parts of an integrated physical unit fixed to said asset.

11. The system of claim 7, wherein at least part of said transmission by said first monitoring system portion is during a time when said second monitoring system portion is unable to access said second communication network.

12. The system of claim 7, wherein said second communication network covers an area that facilitates a collection of multiple assets.

13. A method in a monitoring system affixed to an asset, said asset traversing a route from a first location to a second location, comprising
   transmitting, by a first monitoring system portion of said monitoring system to a service center via a first communication network, monitoring information during a first part of said route from said first location to said second location; and
   transmitting, by a second monitoring system portion of said monitoring system to said service center via a second communication network different from said first communication network, monitoring information during a second part of said route from said first location to said second location, wherein during at least a portion of said second part of said route, said first monitoring system portion does not have access to said first communication network.

14. The method of claim 13, wherein said first communication network is a satellite communication network and said second communication network is a non-satellite communication network.

15. The method of claim 13, wherein said first monitoring system portion and said second monitoring system portion are separate physical units fixed to said asset.

16. The method of claim 13, wherein said first monitoring system portion and said second monitoring system portion are parts of an integrated physical unit fixed to said asset.

17. The method of claim 13, wherein during at least a portion of said first part of said route said second monitoring system portion does not have access to said second communication network.

18. The method of claim 13, wherein said second communication network covers an area that facilitates a collection of multiple assets.

\* \* \* \* \*